United States Patent
Pierce et al.

(10) Patent No.: US 8,657,370 B1
(45) Date of Patent: Feb. 25, 2014

(54) ROOF DITCH MOLDING AND METHOD OF MANUFACTURE

(71) Applicant: Ford Global Technologies, LLC, Dearborn, MI (US)

(72) Inventors: Joel Thomas Pierce, Whitmore Lake, MI (US); Michael Musleh, Canton, MI (US); Paul Kenneth Dellock, Northville, MI (US); Harry Lobo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/656,884

(22) Filed: Oct. 22, 2012

(51) Int. Cl.
*B60R 13/07* (2006.01)

(52) U.S. Cl.
USPC .......................................... 296/213; 296/210

(58) Field of Classification Search
USPC .................................. 296/210, 213
See application file for complete search history.

(56) References Cited

U.S. PATENT DOCUMENTS

| | | |
|---|---|---|
| 7,004,535 B1 | 2/2006 | Osterberg et al. |
| 7,029,060 B1 | 4/2006 | Osterberg et al. |
| 7,045,189 B2 | 5/2006 | Hui et al. |
| 7,401,395 B2 | 7/2008 | Unger et al. |
| 7,621,574 B2 | 11/2009 | Mourou et al. |
| 7,695,038 B2 | 4/2010 | Harberts et al. |
| 8,020,354 B2 * | 9/2011 | Scroggie et al. ............. 52/716.6 |
| 8,070,204 B2 | 12/2011 | Mourou |
| 2005/0153080 A1 | 7/2005 | Zohar et al. |
| 2007/0227073 A1 | 10/2007 | Tognetti et al. |
| 2009/0021053 A1 * | 1/2009 | Harberts et al. ............. 296/213 |
| 2009/0186217 A1 | 7/2009 | Brzoskowski et al. |
| 2009/0188198 A1 * | 7/2009 | Scroggie et al. ............. 52/716.7 |
| 2010/0196629 A1 | 8/2010 | Mourou et al. |
| 2011/0010898 A1 * | 1/2011 | Scroggie et al. ................ 24/292 |
| 2011/0204671 A1 | 8/2011 | Baratin |
| 2012/0025564 A1 | 2/2012 | Ellis et al. |

* cited by examiner

*Primary Examiner* — Lori Lyjak
(74) *Attorney, Agent, or Firm* — Raymond L. Coppiellie; Brooks Kushman P.C.

(57) ABSTRACT

A roof ditch molding and a method of manufacture. The roof ditch molding may include a channel and a skin that are co-extruded from different polymeric materials.

14 Claims, 3 Drawing Sheets

ROOF DITCH MOLDING AND METHOD OF MANUFACTURE

TECHNICAL FIELD

This application relates to a roof ditch molding and a method of manufacture.

BACKGROUND

A roof ditch molding structure is disclosed in U.S. Pat. No. 7,029,060.

SUMMARY

In at least one embodiment, a roof ditch molding is provided. The roof ditch molding may include a channel and a skin. The channel may have a center portion, a first curved end portion, and a second curved end portion. The center portion may have a first surface. The first and second curved end portions may extend from opposite ends of the center portion and may have the substantially similar configurations. The skin may be disposed on the first surface and at least one of the first and second curved end portions.

In at least one embodiment, a roof ditch molding is provided. The roof ditch molding may include a channel and a skin. The channel may include a center portion, a first curved end portion, and a second curved end portion. The center portion may have a first surface and a second surface disposed opposite the first surface. The first curved end portion may extend from the center portion and may have a first free end. The second curved end portion may be disposed opposite the first curved end portion and may have a second free end. The skin may be disposed on the first surface and at least one of the first and second curved end portions such that the skin is spaced apart from the first and second free ends.

In at least one embodiment, a method of manufacturing a roof ditch molding is provided. The method may include coextruding a channel made of a first polymeric material and a skin made of a second polymeric material to form a roof ditch molding. The channel may have a center portion and first and second curved end portions that extend from opposite ends of the center portion. The skin may be disposed on the center portion and at least one of the first and second curved end portions.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
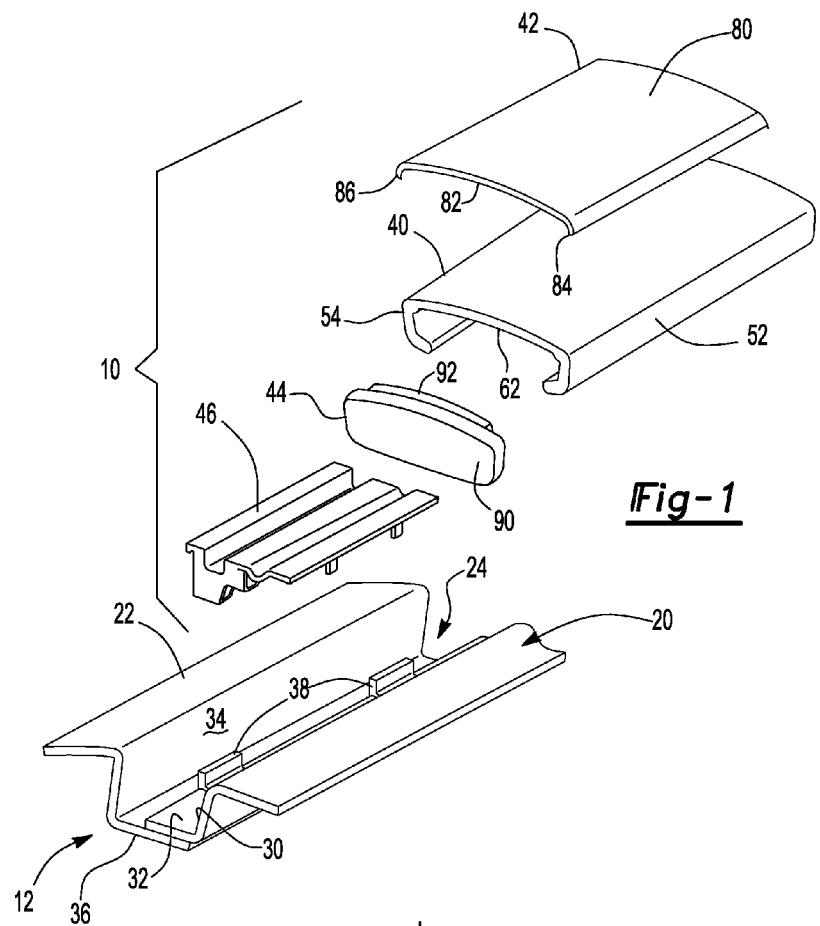
FIG. 1 is an exploded perspective view of a roof ditch molding, a mounting clip, and a vehicle body structure.

Referring to FIG. 1, an example of a roof ditch molding 10 and a portion of a vehicle body structure 12 are shown. The vehicle body structure 12 may be provided with a motor vehicle, such as a car, truck, bus or the like.

The vehicle body structure 12 may include a plurality of panels, such as a first panel 20 and a second panel 22. In at least one embodiment, the first panel 20 may be a roof panel that defines at least a portion of a roof of the vehicle and the second panel 22 may be a body side panel that defines at least a portion of a side of the vehicle. The first and second panels 20, 22 may be sheet metal and may be joined together in any suitable manner, such as by welding.

The first and second panels 20, 22 may cooperate to form or at least partially define a ditch 24 that may receive the roof ditch molding 10. In at least one embodiment, the ditch 24 may have a generally U-shaped cross-section. For example, the first panel 20 may have first and second portions 30, 32 that may form a portion of the ditch 24. Similarly, the second panel 22 may have first and second portions 34, 36 that form additional portions of the ditch 24. The first portions 30, 34 may be spaced apart and disposed opposite each other while the second portions 32, 34 may be joined together and form the bottom of the ditch 24.

In one or more embodiments, a set of tabs 38 may extend from a panel to facilitate mounting of the roof ditch molding 10 to the vehicle body structure 12. In the embodiment shown, a tab 38 is shown that is disposed between the first portions 30, 34 and extends upwardly from an end of the first panel 20, or in a direction that extends away from the second portion 36. A plurality of tabs 38 may be provided that may be spaced apart from each other to provide multiple roof ditch molding mounting locations. Alternatively, the tabs 38 may be omitted in one or more embodiments depending on the mounting clip configuration that is employed.

Figure 2:
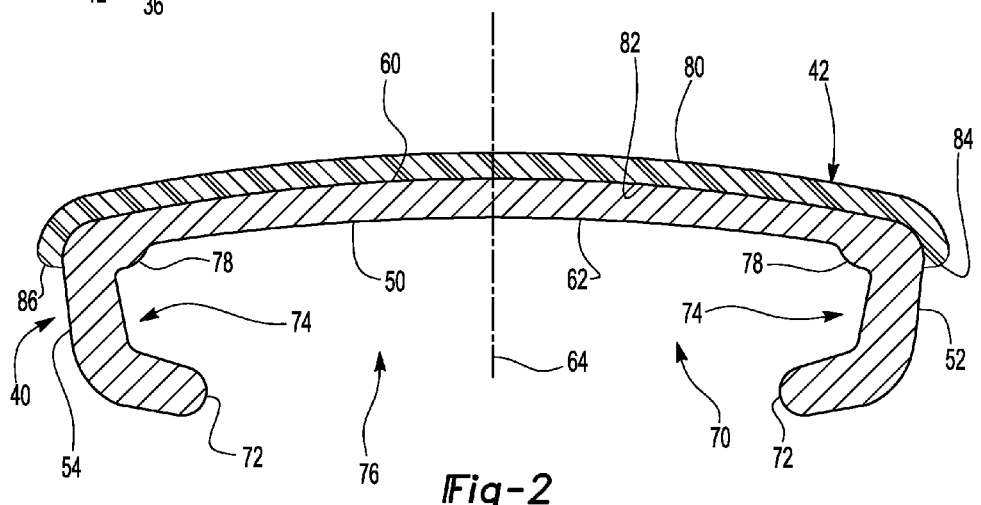
FIG. 2 is a section view of the roof ditch molding of FIG. 1.

Referring to FIGS. 1 and 2, one or more roof ditch moldings 10 may be provided with the vehicle. For example, a pair of roof ditch moldings 10 may be provided in separate ditches 24 that may extend in a generally longitudinal direction (i.e., front to back) along the left and right sides of the vehicle. In at least one embodiment, a roof ditch molding 10 may generally extend in a continuous manner from a front pillar that may be disposed near a windshield to a rear pillar that may be disposed proximate a rear window of the vehicle. The roof ditch molding 10 may conceal the edges of the first and second panels 20, 22 and associated welds to provide a desired aesthetic appearance. In addition, the roof ditch molding 10 may help shield the interface between the first and second panels 20, 22 from water and contaminants. In at least one embodiment, the roof ditch molding 10 may include a channel 40, a skin 42, one or more end caps 44, and one or more mounting clips 46.

The channel 40 may receive and support various components of the roof ditch molding 10. The channel 40 may be made of any suitable non-metallic material, such as a polymeric material like polypropylene that may or may not be glass-filled. The channel 40 and skin 42 may be coextruded as will be discussed in more detail below. In the embodiment shown in FIG. 2, the channel 40 has a generally C-shaped cross-section that may include a center portion 50, a first curved end portion 52, and a second curved end portion 54.

The center portion 50 may be disposed proximate the center of the channel 40 and may have a first surface 60 and a second surface 62. The first surface 60 may face toward and may engage the skin 42. The second surface 62 may be disposed opposite the first surface 60. In at least one embodiment, the channel 40 may be symmetrical with respect to a center plane 64. As such portions of the channel 40 that are disposed on opposite sides of the center plane 64 may be generally configured as mirror images of each other.

The first and second curved end portions 52, 54 may be spaced apart from each other and may extend from opposite ends of the center portion 50. For example, the first curved end portion 52 may extend from a first end of the center portion 50 while the second curved end portion 54 may extend from a second end of the center portion 50 that is disposed opposite the first end. The first and second curved end portions 52, 54 may cooperate with the center portion 50 to at least partially define a cavity 70 that may receive the mounting clip 46. In at least one embodiment, the first and second curved end portions 52, 54 may have substantially C-shaped cross sections and may extend away from the second surface 62, or downwardly from the perspective shown in FIG. 2. The first and second curved end portions 52, 54 may have free ends 72 that extend toward each other to help define a notch 74 that receives the mounting clip 46. The free ends 72 may be spaced apart from each other such that an opening 76 is formed between them.

One or more reinforcement beads 78 may be provided with the channel 40. In the embodiment shown in FIG. 2, a reinforcement bead 78 may be provided with the first curved end portion 52 and the second curved end portion 54. The reinforcement bead 78 may run continuously between the ends of the roof ditch molding 10 and may have a greater cross sectional thickness than the center portion 50. As such, the reinforcement bead 78 may help strengthen the channel 40 and help the channel 40 maintain a desired shape. The reinforcement bead 78 may extend from the second surface 62 into the cavity 70 and may help define the notch 74. Moreover, the cross section of the reinforcement bead 78 may be curved or convex with respect to the center portion 50 in one or more embodiments.

The skin 42 may form an exterior surface of the roof ditch molding 10 that may be visible when the roof ditch molding 10 is installed on the vehicle body structure 12. The skin 42 may be made of a different polymeric material than the channel 40, such as an ultraviolet stable vulcanized thermoplastic (TPV). In addition, the skin 42 may include a decorative layer, such as an extruded film, that may be disposed on a visible exterior surface of the skin to provide a desired color, texture, and/or chrome-like appearance.

The skin 42 may be disposed on the channel 40. The skin 42 may be coextruded with the channel 40 and may have a cross sectional thickness that is less than the thickness of the channel 40 in one or more embodiments. The skin 42 may include a first skin surface 80, a second skin surface 82, a first skin end 84, and a second skin end 86.

The first skin surface 80 may be an exterior surface of the skin 42. The second skin surface 82 may be disposed opposite the first skin surface 80 and may engage the channel 40. For instance, the second skin surface 82 may engage the first surface 60 of the center portion 50 and may overlap at least a portion of the first and second curved end portions 52, 54. In the embodiment shown in FIG. 2, the skin 42 extends downwardly along the first and second curved end portions 52, 54 and along respective exterior surfaces that are disposed opposite the cavity 70. The skin 42 may generally cover areas of the roof ditch molding 10 that may be exposed to ultraviolet radiation and/or that may engage the vehicle body structure 12. For example, the skin 42 may generally terminate opposite the notch 74 and may be spaced apart from the free ends 72 of the first and second curved end portions 52, 54. As such, the first skin end 84 may be generally disposed opposite the reinforcement bead 78 of the first curved end portion 52 and the second skin end 86 may be generally disposed opposite the reinforcement bead 78 of the second curved end portion 54.

One or more end caps 44 may be provided with the roof ditch molding 10. For example, an end cap 44 may be installed at each end of the roof ditch molding 10 to help enclose the ends of the cavity 70. An end cap 44 may be made of one or more polymeric materials like those of the channel 40 and/or skin 42. In at least one embodiment, the end cap 44 may include a cap portion 90 and a mounting tab 92. The mounting tab 92 may extends from the cap portion 90 and may be received in the cavity 70 and/or notches 74 with an interference fit to secure the end cap 44 to the channel 40.

One or more mounting clips 46 or mounting cleats may be provided to facilitate coupling of the roof ditch molding 10 to the vehicle body structure 12. A mounting clip 46 may be slid into the cavity 70 and received in the notches 74 to inhibit movement of the mounting clip 46 in one or more directions. For example, the mounting clips 46 may be permitted to slide in the cavity 70 between the ends of the roof ditch molding 10 but may be inhibited from being pulled through the opening 76 or downwardly from the perspective shown in FIGS. 1 and 2. Each mounting clip 46 may receive a corresponding tab 38 to couple the roof ditch molding 10 to the vehicle body structure 12. Alternatively, different mounting clip designs 46 may be employed in various embodiments.

Figure 3:
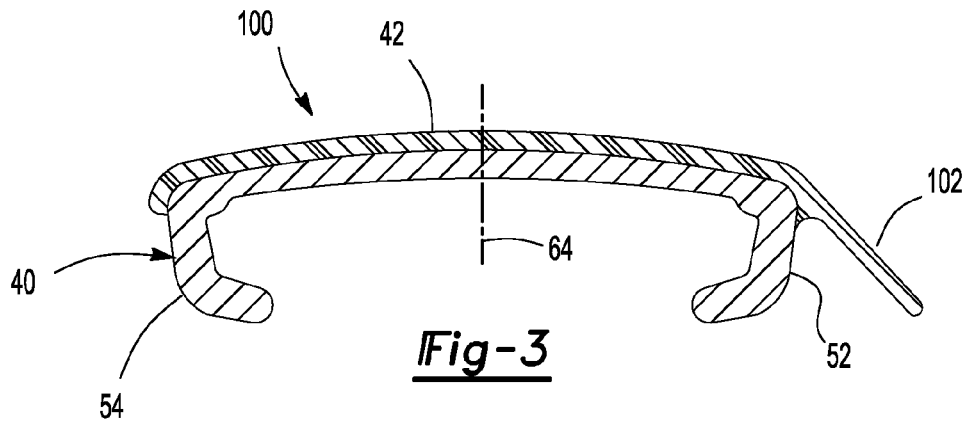
FIGS. 3-5 are additional roof ditch molding embodiments.
Figure 4:
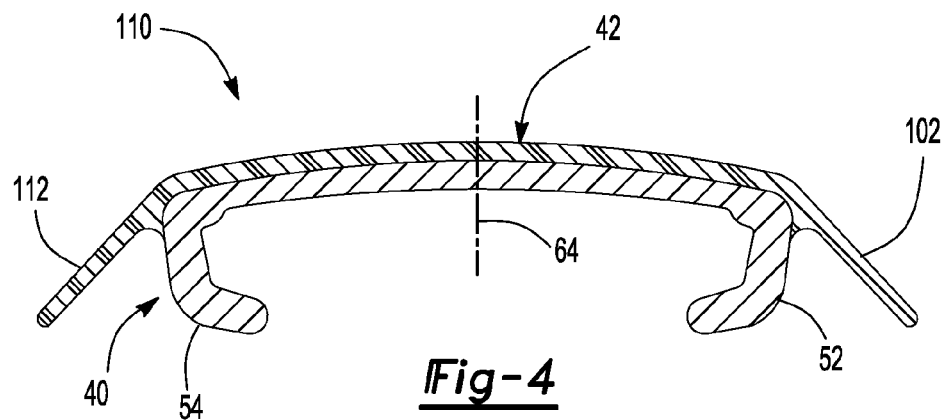
Figure 5:
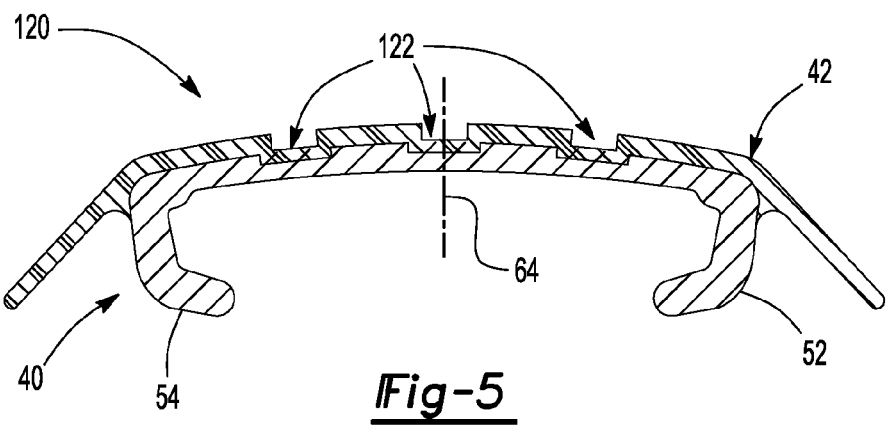

Referring to FIGS. 3-5, cross sections of additional roof ditch molding embodiments are shown. Each embodiment may be configured to receive at least one end cap 44 and mounting clip 46 as previously discussed. For brevity, characteristics are discussed that have not been previously addressed.

Referring to FIG. 3, a roof ditch molding 100 is shown in which the skin 42 includes a first lip 102. The first lip 102 may engage a panel of the vehicle body structure 12, such as the first panel 20 or the second panel 22, to inhibit liquid from entering the ditch 24 and/or to help control drainage. The first lip 102 may be spaced apart from the channel 40 and may extend downwardly from the perspective shown and at an obtuse angle with respect to the first surface 60 and the center plane 64. In addition, the distal end of the first lip 102 may extend down to the bottom of the channel 40 in one or more embodiments.

Referring to FIG. 4, the roof ditch molding 110 includes a second lip 112. The second lip 112 may be disposed opposite the first lip 102 and may have a similar configuration as the first lip 102. The second lip 112 may engage a different panel of the vehicle body structure 12 than the first lip 102. The second lip 112 may be spaced from the channel 40 and may extend downwardly from the perspective shown and at an obtuse angle with respect to the first surface 60 and the center plane 64. In addition, the distal end of the second lip 112 may extend down to the bottom of the channel 40 in one or more embodiments.

Referring to FIG. 5, the roof ditch molding 120 may include one or more grooves 122. The grooves 122 may extend the length of the roof ditch molding 120 and may help direct fluids, such as water, along the length of the roof ditch molding 120 and/or may provide a desired aesthetic appearance. The grooves 122 may extend from the first skin surface 80 toward the second skin surface 82. In FIG. 5, corresponding grooves or indentations are also provided in the channel 40 that may extend from the first surface 60 toward the second surface 62; however, these grooves may be omitted to yield a channel cross section similar to that shown in FIGS. 2-4. It is contemplated that grooves 122 may be provided with any of the roof ditch molding embodiments previously discussed and in a greater or lesser quantity.

Figure 6:
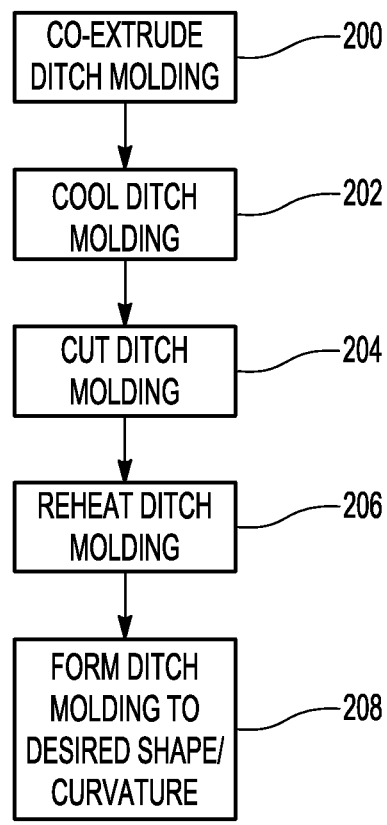
FIG. 6 is a flowchart of a method of manufacturing a roof ditch molding.

Referring to FIG. 6, an exemplary flowchart of a method of making a roof ditch molding is shown. The method may be applied to manufacture any of the roof ditch molding variations previously discussed.

At 200, the channel and skin may be simultaneously coextruded to form the roof ditch molding. The channel 40 and skin 42 may be coextruded by pushing or drawing the respective materials through a die having at least one opening that provides a desired roof ditch molding cross section. More specifically, two or more extruders may be utilized to melt the desired volumes of viscous polymeric materials for the channel 40 and skin 42 and deliver those materials to a common extrusion head or extrusion die. The extrusion die may shape the materials into a desired cross-sectional shape. As such, the skin 42 may be extruded onto the channel 40, thereby producing a roof ditch molding that has multiple layers that are simultaneously extruded.

At 202, the roof ditch molding may be cooled. For example, the roof ditch molding may be cooled to a desired or predetermined temperature to help harden the extruded roof ditch molding and facilitate subsequent processing steps. Alternatively, this step may be omitted in one or more embodiments.

At 204, the roof ditch molding may be cut to a desired length. The roof ditch molding may be cut as part of a continuous flow process in which the roof ditch molding is fed to a cutting tool and cut after extrusion and/or cooling. Alternatively, the roof ditch molding may be cut as part of a discontinuous flow process. For example, the roof ditch molding that was previously extruded and stored, such as in a coil, may be fed to a cutting tool and cut to a predetermined length.

At 206, the roof ditch molding may be reheated to facilitate additional forming steps. For example, the roof ditch molding may be heated to a temperature that is the less than the melting temperature of its constituent materials to soften or increase the pliability of the roof ditch molding. Heating may be accomplished in any suitable manner, such as by placing the roof ditch molding in an oven for a predetermined amount of time.

At 208, the roof ditch molding may be formed to a desired shape. For example, the roof ditch molding may be placed in a fixture or mold having a predetermined shape. Force may be exerted upon the roof ditch molding to press the roof ditch molding against the fixture or mold, thereby forming the roof ditch molding to a desired shape. As another example, the roof ditch molding may be fed through a set of rollers that may engage opposite sides of the roof ditch molding and impart a substantially uniform curvature or radius of curvature to the roof ditch molding. In either manner, the roof ditch molding may be provided with a shape that that is similar to the curvature or shape of the ditch in which it will be installed. The roof ditch molding may be cooled after forming to allow the roof ditch molding to harden and retain the formed shape. Steps 206 and 208 may be omitted in various embodiments when additional forming is not desired. Mounting clips 46 and end caps 44 may then be installed and the roof ditch molding may be mounted to the vehicle body structure 12.

The examples of roof ditch moldings and methods of manufacture discussed above may allow a roof ditch molding to be made without a metal reinforcement, such as a stainless steel rod that may extend the length of the roof ditch mold, thereby reducing the cost per part. In addition, impact resistance may be improved by eliminating such stainless steel rods. Moreover, tooling cost may be reduced by approximately 70% by utilizing extrusion dies in lieu of roll form dies that may be associated with rod fabrication and tooling lead times may be reduced.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A roof ditch molding comprising:
    a channel that includes:
        a center portion that has a first surface and a second surface disposed opposite the first surface, and
        first and second curved end portions that extend from opposite ends of the center portion and have substantially similar configurations, wherein the first curved end portion has a first reinforcement bead that extends from the second surface such that the first reinforcement bead has a greater cross sectional thickness than the center portion; and
    a skin that is disposed on the first surface and at least one of the first and second curved end portions.

2. The roof ditch molding of claim 1 wherein the skin includes a first lip that is spaced apart from the channel.

3. The roof ditch molding of claim 1 wherein the first reinforcement bead is convex with respect to the center portion.

4. The roof ditch molding of claim 1 wherein the second curved end portion further comprises a second reinforcement bead that extends from the second surface such that the second reinforcement bead has a greater cross sectional thickness than the center portion.

5. The roof ditch molding of claim 4 wherein the second reinforcement bead is convex with respect to the center portion.

6. The roof ditch molding of claim 4 wherein the skin includes a first skin end that is disposed on the first curved end portion opposite the first reinforcement bead.

7. The roof ditch molding of claim 6 wherein the skin includes a second skin end disposed opposite the first skin end, wherein the second skin end is disposed on the second curved end portion opposite the second reinforcement bead.

8. The roof ditch molding of claim 1 wherein the first and second curved end portions have C-shaped cross sections and are configured as are mirror images of each other.

9. A roof ditch molding comprising:
    a channel that includes:
        a center portion that has a first surface and a second surface disposed opposite the first surface,
        a first curved end portion that extends from the center portion, the first curved end portion having a first free end and a first reinforcement bead that extends from the second surface toward the first free end, and
        a second curved end portion that extends from the center portion and is disposed opposite the first end portion, the second curved end portion having a second free end; and
    a skin that is disposed on the first surface and at least one of the first and second curved end portions such that the skin is spaced apart from the first and second free ends and disposed opposite the first reinforcement bead.

10. The roof ditch molding of claim 9 wherein the skin includes a first lip that is spaced apart from the channel, wherein the first lip extends downwardly at an obtuse angle with respect to the first surface.

11. The roof ditch molding of claim 10 wherein the skin includes a second lip that is spaced apart from the channel and disposed opposite the first lip, wherein the second lip extends downwardly at an obtuse angle with respect to the first surface.

12. The roof ditch molding of claim 9 wherein the center portion includes at least one groove.

13. The roof ditch molding of claim 9 wherein the second curved end portion further comprises a second reinforcement bead, wherein the second reinforcement bead is disposed opposite the skin and extends from the second surface toward the second free end.

14. The roof ditch molding of claim 9 wherein the skin includes a first skin surface and a second skin surface that is disposed opposite the first skin surface and that engages the first surface of the center portion, wherein the first skin surface includes at least one groove that extends toward the second skin surface.

* * * * *